United States Patent
Gopalakrishnan et al.

(10) Patent No.: US 9,641,526 B1
(45) Date of Patent: May 2, 2017

(54) LOCATION BASED AUTHENTICATION METHODS AND SYSTEMS

(71) Applicant: Amazon Technologies, Inc., Reno, NV (US)

(72) Inventors: Varadarajan Gopalakrishnan, Cupertino, CA (US); Albert William Wegener, Aptos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 22 days.

(21) Appl. No.: 14/298,218

(22) Filed: Jun. 6, 2014

(51) Int. Cl.
*G06F 21/44* (2013.01)
*H04L 29/06* (2006.01)
*H04W 12/06* (2009.01)

(52) U.S. Cl.
CPC ...... *H04L 63/0876* (2013.01); *H04L 63/0861* (2013.01); *H04W 12/06* (2013.01); *H04L 2463/101* (2013.01)

(58) Field of Classification Search
CPC ....... H04L 63/0861; G06F 21/44; G06F 21/31
See application file for complete search history.

(56) References Cited

U.S. PATENT DOCUMENTS

| | | | |
|---|---|---|---|
| 6,735,328 B1 | 5/2004 | Helbing | |
| 8,743,782 B1 * | 6/2014 | Patel | G01S 5/0242 370/328 |
| 2014/0341441 A1 * | 11/2014 | Slaby | G06F 21/32 382/117 |
| 2014/0368336 A1 * | 12/2014 | Felix | H04W 4/008 340/539.13 |

* cited by examiner

*Primary Examiner* — Izunna Okeke
(74) *Attorney, Agent, or Firm* — Seyfarth Shaw LLP; Ilan N. Barzilay

(57) ABSTRACT

A wearable computing device, such as a wearable credit card type device or a wearable identification type device, that provides for location based authentication to verify that a user currently in possession of the wearable computing device is indeed the authorized user. In this aspect, the wearable computing device may detect wireless network signals in range of the wearable computing device, and transmit authentication data and the detected wireless network signals to an authentication service. The wearable computing device may then be authenticated when the authentication data corresponds to the user and the detected wireless network signals correspond to a pre-authorized location for authentication.

19 Claims, 9 Drawing Sheets

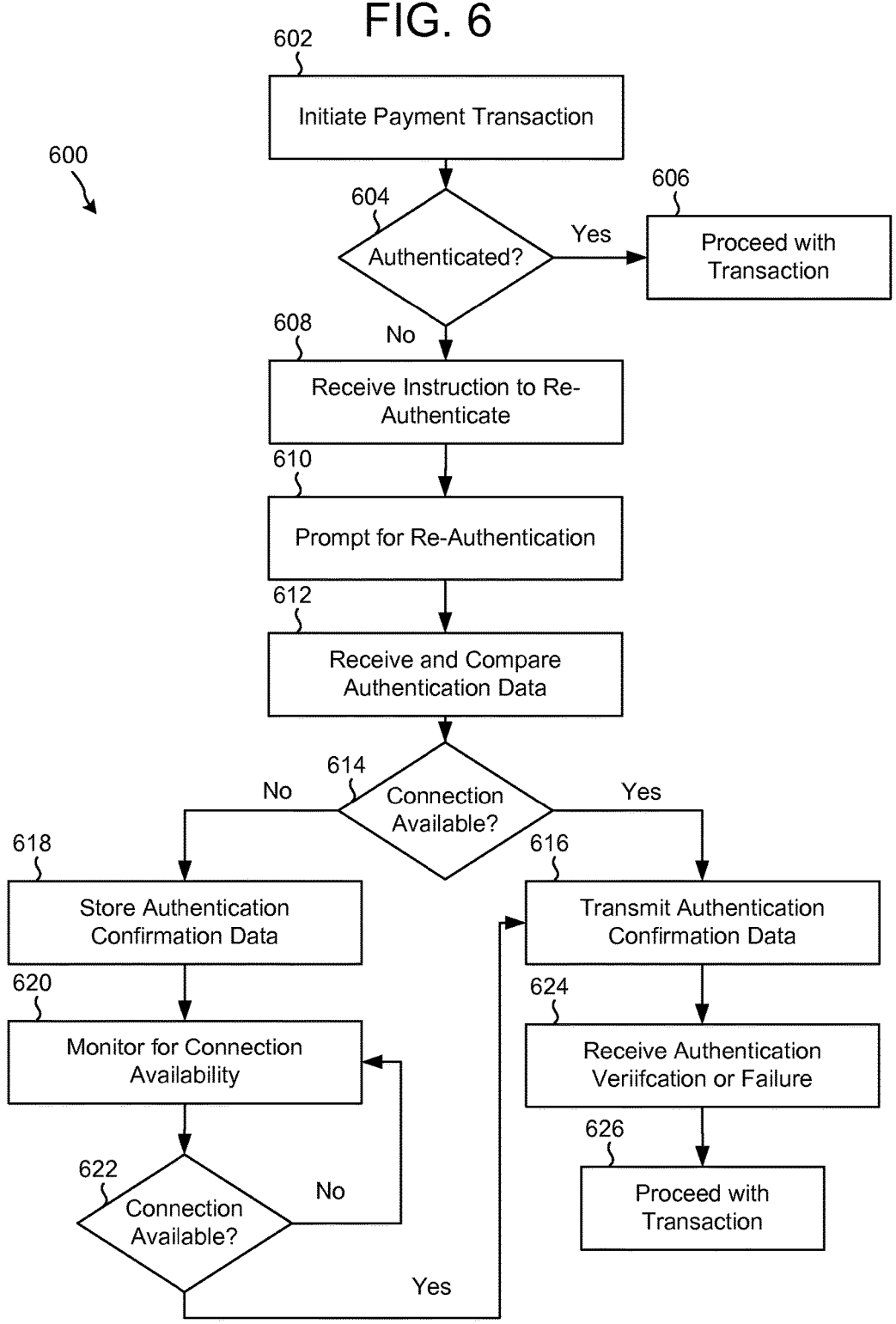

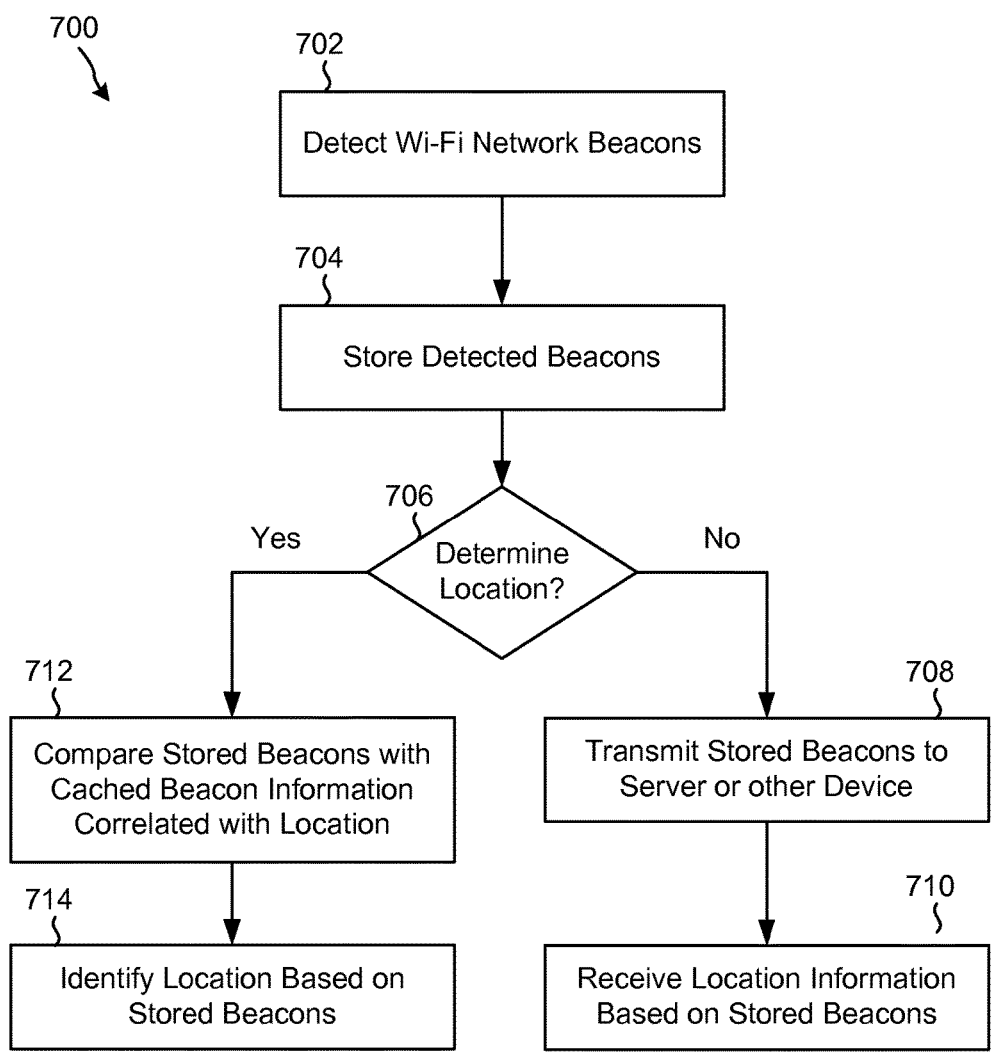

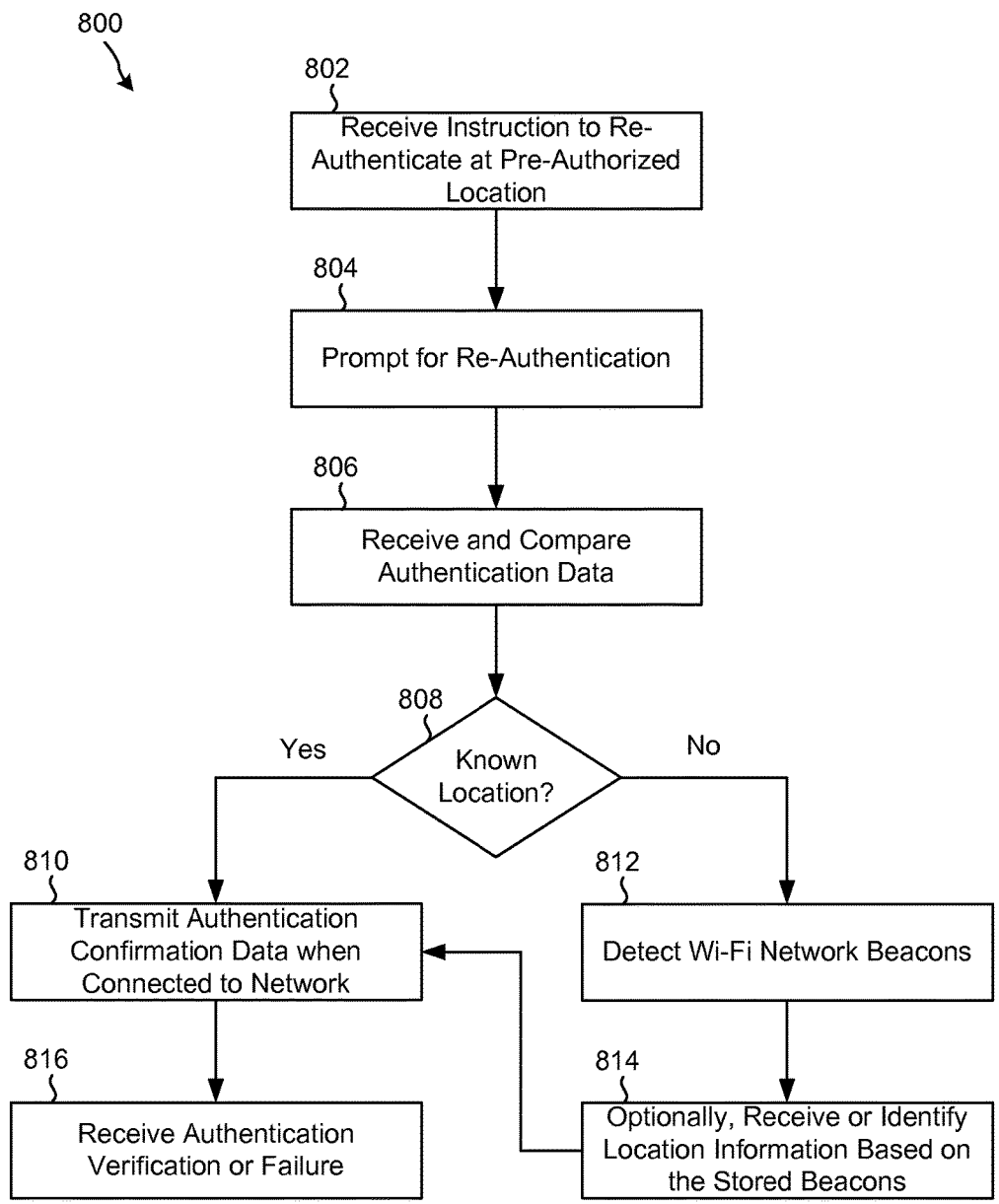

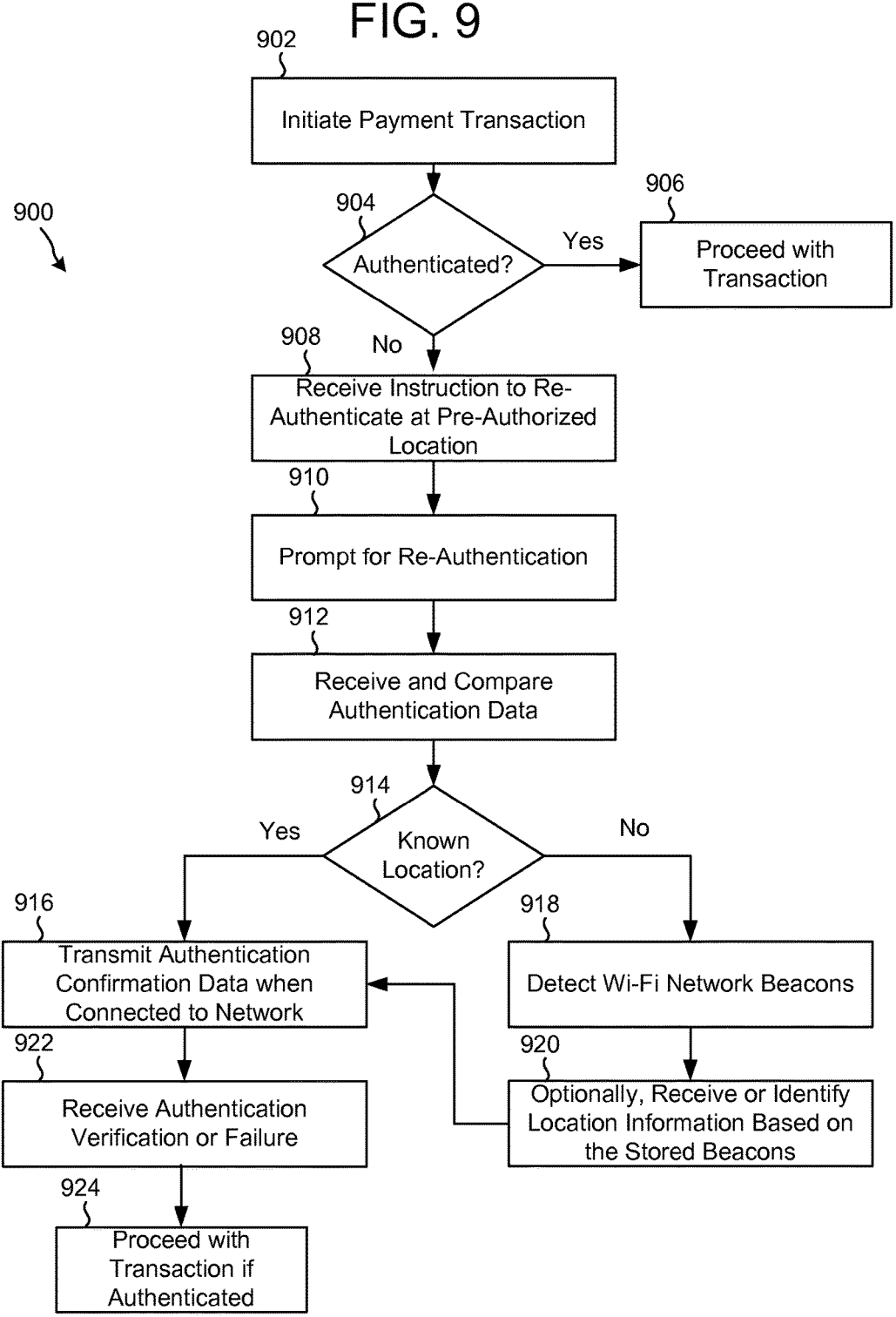

LOCATION BASED AUTHENTICATION METHODS AND SYSTEMS

BACKGROUND

With the advancement of technology, the use and popularity of wearable computing devices, such as accessories incorporating computer and other electronic technology, has increased. These wearable computing devices may be used to monitor exercise regimes, quantify self, and/or as an identification device. These devices also tend to have limited computing power and rely on a connection to another device to perform more robust computing processes.

BRIEF DESCRIPTION OF DRAWINGS

For a more complete understanding of the present disclosure, reference is now made to the following description taken in conjunction with the accompanying drawings.

FIG. 6 illustrates another functional block diagram of a method for performing deferred authentication according to aspects of the present disclosure.

FIG. 7 illustrates a functional block diagram of a method for determining location according to aspects of the present disclosure.

FIG. 8 illustrates a functional block diagram of a method for re-authenticating using location information according to aspects of the present disclosure.

FIG. 9 illustrates a functional block diagram of a method for re-authenticating using point of sale location information according to aspects of the present disclosure.

DETAILED DESCRIPTION

Figure 1:
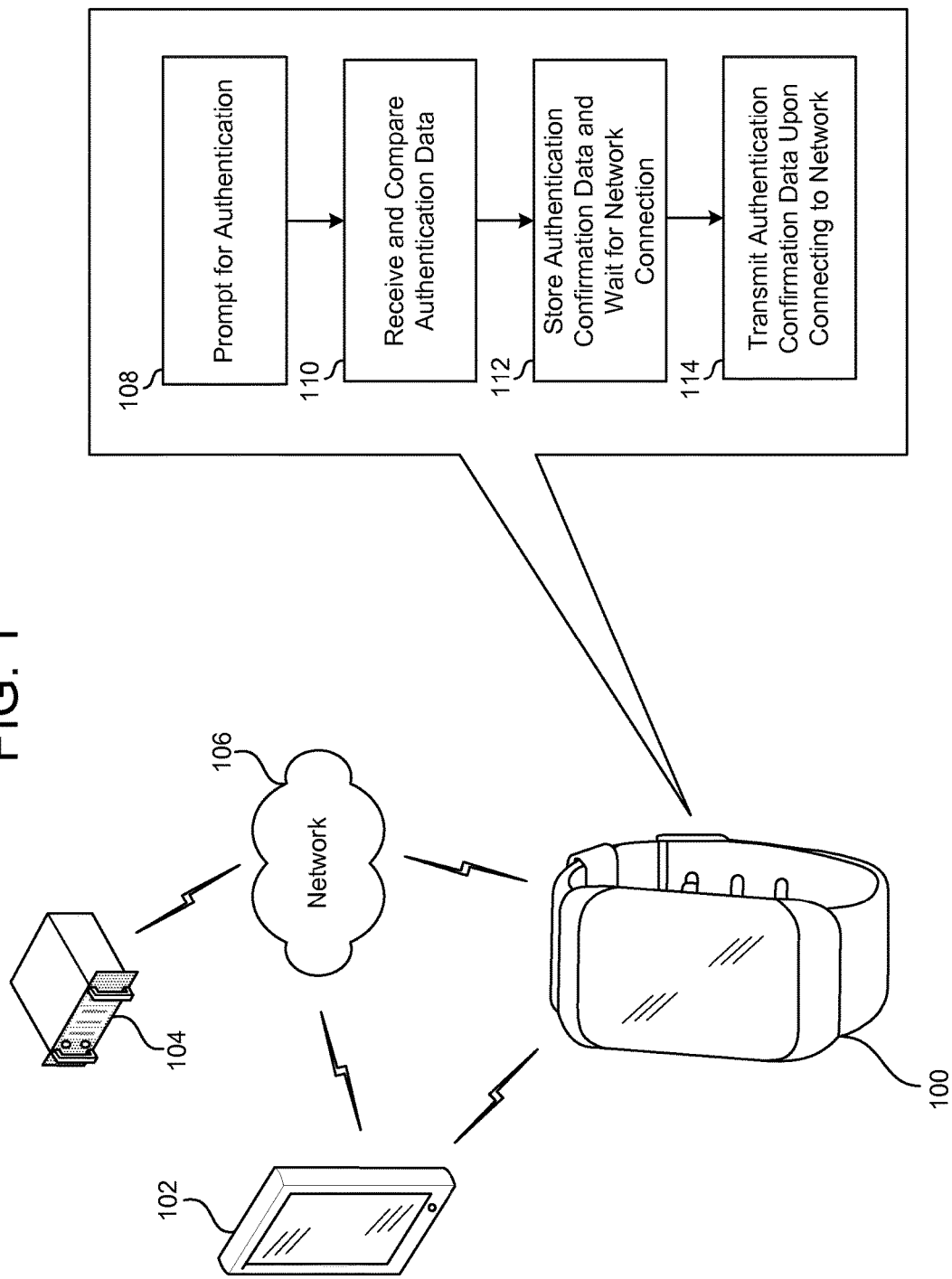
FIG. 1 illustrates an overview of a wearable computing device for implementing aspects of the present disclosure.

Information related to a person's identity, financial information, and/or credit cards can be easily compromised. In an aspect, such information may be secured by using periodic or non-periodic re-authentication to relate a specific user to his/her credit card or identification device. In this aspect, a challenge and response method may be used to require regular re-authentication, for example, via a PIN, password, fingerprint, voiceprint, or other biometric feature. The biometric feature may be biometric data corresponding to a physical characteristic of the user that may differentiate the user from other users. Biometric features/data may include, for example a voice print, a fingerprint, a facial image, a cardiac rhythm, retinal scan, etc. To further increase security, authentication using the biometric data may be data created or generated. For example, the biometric data may include encrypted biometric results, information extracted from the biometric data, or other information that may be used to identify the biometric data to prevent others from intercepting or otherwise obtaining the raw biometric input data. Location information may also be incorporated, so that the regular re-authentication may only occur within a limited number of geographic locations, such as the user's home or office. Such a methodology may aid in preventing fraud in the event the user's authentication ID (i.e., password) was compromised or the authorized user was forced to use his/her authentication ID against the user's will at a location away from the user's home or office.

In an aspect, a wearable computing device may be used to identify and/or authenticate the user or wearer of a device. Such authentication may be used for a variety of transactions including, for example, to allow authorization of a payment transaction including credit card transactions, to allow identification for entering into buildings, to allow identification for public transport including airports, and other situations in which a person may be required to authenticate himself/herself. In this aspect, a wearable computing device, such as a wearable credit card type device or a wearable identification type device, may require regular (periodic or random) re-authentication that the person currently in possession of the wearable computing device is indeed the authorized user.

In an aspect, a wearable computing device is disclosed that provides for periodic or non-periodic re-authentication. In this aspect, the wearable computing device provides for deferred authentication when the wearable computing device is not connected to another device via a wireless local area network (WLAN) (such as WiFi), Bluetooth, infrared (IR), and/or other wireless network radio, such as a radio capable of communication with a wireless communication network such as a Long Term Evolution (LTE) network, WiMAX network, 3G network, etc. In this aspect, the wearable computing device may allow for user or wearer authentication at any time.

FIG. 1 illustrates an overview of a wearable computing device 100 for implementing aspects of the disclosure. As illustrated, the wearable computing device 100 implements a periodic or non-periodic (for example, at random or quasi-random intervals) re-authentication methodology. In this aspect, the wearable computing device 100 may communicate directly with another device, such as a smartphone 102, or indirectly with another device, such as with an authentication server 104 through a network 106 to provide re-authentication for transactions. The authentication/re-authentication may be configured in a challenge and response way that may be initiated from the authentication server 104, the smartphone 102, etc.

For example, the wearable computing device 100 may determine that the wearable computing device 100 is to perform or obtain a user authentication. The user authentication may be based on a biometric acquisition or other step that authenticates the person currently possessing the wearable computing device 100. The determination may be based on receiving a message from the authentication server 104, or based on the wearable device 100 being programmed to automatically re-authenticate at selected time intervals, ranges, or windows (e.g. hourly, daily, weekly, etc.), or in another manner. In this aspect, the wearable computing device 100 may prompt the user to authenticate or re-authenticate, illustrated as block 108. The authentication may be an authentication response including user input authentication data, such as, a PIN or password, a voice print, a fingerprint, facial recognition, retinal scan, finger cardiac rhythm, electrocardiography (ECG or EKG), or other biometric or form of authentication, etc. In certain aspects, authentication may be taken without a separate user action (for example, by taking a bio-measurement without first prompting the user). Although authentication data may be taken without direct user action, such data may still be considered user input authentication data for purposes of this disclosure.

Upon receiving the user input authentication data, illustrated as block 110, the wearable computing device 100 may compare the user input authentication data to stored authentication data stored on the wearable computing device 100, also illustrated as block 110. For example, the wearable computing device 100 may compare input biometric data to authentication data stored on the wearable device 100 and determine whether the input biometric data matches or corresponds to the stored authentication data (i.e., the input data was obtained from the original [rightful] user). The wearable computing device 100 may transmit authentication confirmation data to the authentication server 104 for authentication. The authentication confirmation data may include an indication that the user input authentication data matches the stored authentication data. The authentication confirmation data may also include the user input authentication data, for example if a remote device will actually perform the comparing of user input authentication data to stored authentication data. As an example, the authentication confirmation data may be encrypted, and may include information or features relating to the user input authentication data, information extracted from the user input authentication data, data identifying the user input authentication data, data relating to an indication of a comparison of the user input authentication data to stored authentication data, or other form of data that if intercepted by another would not identify the user or compromise the user's identity. As another example, the authentication confirmation data may be an indication of whether the user input authentication data matches or corresponds to the stored authentication data.

However, when the wearable computing device 100 is not in communication with the authentication server 104, the wearable computing device 100 may store the authentication confirmation data in memory and wait or defer transmitting until the wearable computing device 100 is in communication with the authentication server 104, illustrated as block 112. The authentication confirmation data may include timestamp information to indicate when the user input authentication data was obtained from the user. This may assist in authenticating transactions that occur when the wearable computing device 100 is not in communication with the authentication server 104. Upon establishing a communication path with the authentication server 104, the wearable computing device 100 may transmit the authentication confirmation data (and any associated timestamp data) to the authentication server 104 for authentication, illustrated as block 114. This allows the user to provide the necessary user input authentication data input at any time, not only when the wearable computing device 100 is in communication with the authentication server 104.

To further increase security, the authentication confirmation data may also incorporate location data. This location data may be used to permit authentication or re-authentication to occur only when a user (or the wearable computing device 100) is within a limited number of geographic locations, such as the user's home or office. This may be used to prevent re-authentication from occurring in the situation where the user may be forced to re-authenticate against the user's will at an unknown location. In this aspect, the wearable computing device 100 may include Wi-Fi technology operating in a receive-only mode. The location may be determined based on translating received Wi-Fi network(s)' MAC address(es), service set identifier (SSID) or other network identifier(s) received by the wearable computing device 100 at the time the user inputs the user input authentication data. The wearable computing device 100 may also include other location determining components, such as global positioning system (GPS) components or the like.

Figure 2:
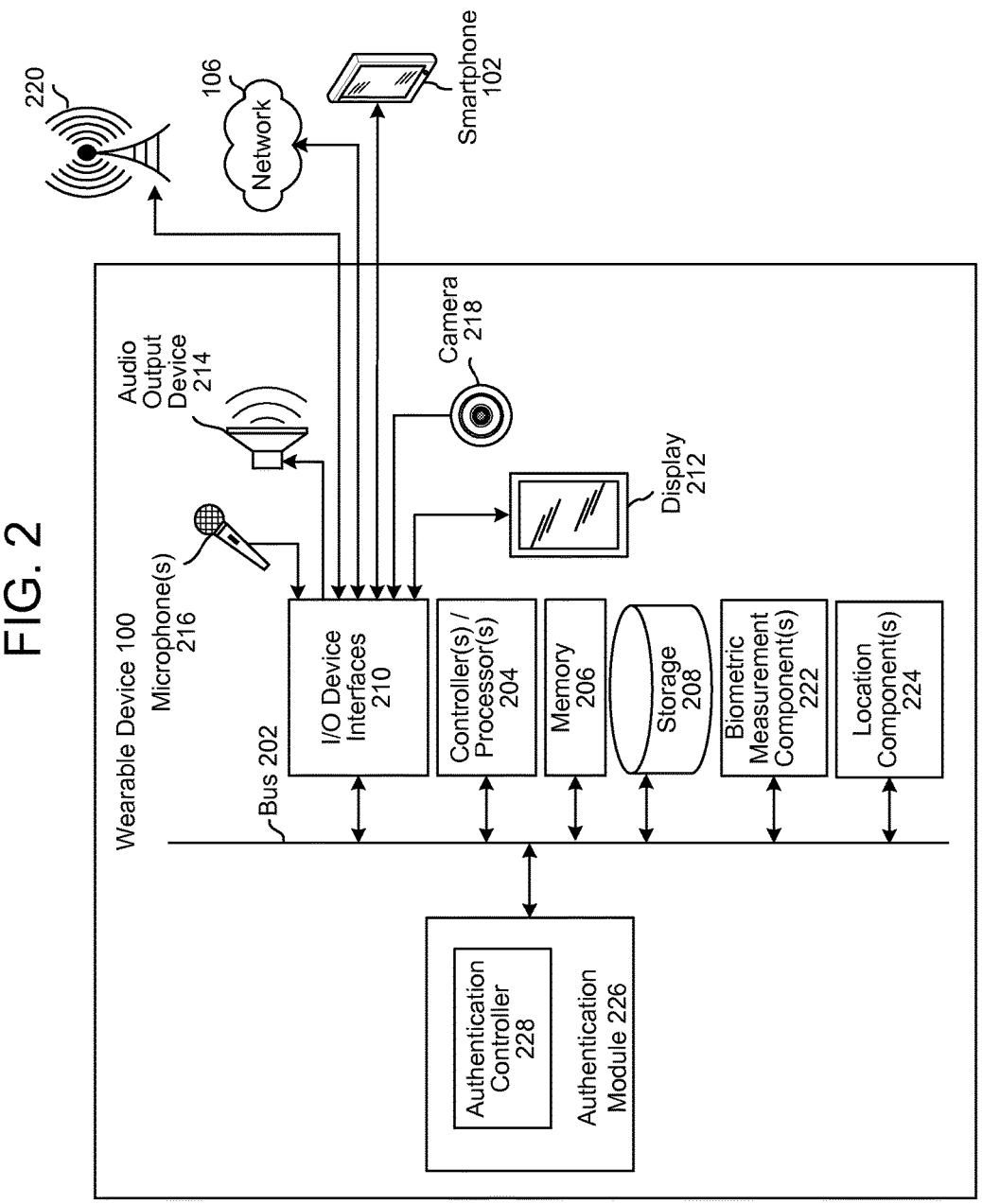
FIG. 2 is a block diagram conceptually illustrating example components of a wearable computing device according to aspects of the present disclosure.

FIG. 2 is a block diagram conceptually illustrating example components of the wearable computing device 100. In operation, the wearable computing device 100 may include computer-readable and computer-executable instructions that reside on the wearable computing device 100, as will be discussed further below.

As illustrated in FIG. 2, the wearable computing device 100 may include an address/data bus 202 for conveying data among components of the wearable computing device 100. Each component within the wearable computing device 100 may also be directly connected to other components in addition to (or instead of) being connected to other components across the bus 202.

The wearable computing device 100 may include one or more microcontrollers/controllers/processors 204 that may each include a central processing unit (CPU) for processing data and computer-readable instructions, and a memory 206 for storing data and instructions. The memory 206 may include volatile random access memory (RAM), non-volatile read only memory (ROM), non-volatile magnetoresistive (MRAM) and/or other types of memory. The wearable computing device 100 may also include a data storage component 208, for storing data, such as authentication and Wi-Fi signal data, and microcontrollers/controller/processor-executable instructions (e.g., instructions to perform one or more steps of the methods illustrated in FIGS. 5-9). The data storage component 208 may include one or more non-volatile storage types such as magnetic storage, optical storage, solid-state storage, etc. The wearable computing device 100 may also be connected to removable or external non-volatile memory and/or storage (such as a removable memory card, memory key drive, networked storage, etc.) through input/output device interfaces 210.

Computer instructions for operating the wearable computing device 100 and its various components may be executed by the microcontroller(s)/controller(s)/processor(s) 204, using the memory 206 as temporary "working" storage at runtime. The computer instructions may be stored in a non-transitory manner in non-volatile memory 206, storage 208, or an external device. Alternatively, some or all of the executable instructions may be embedded in hardware or firmware in addition to or instead of software.

The wearable computing device 100 includes input/output device interfaces 210. A variety of components may be connected through the input/output device interfaces 210, such as a display 212 having a touch surface or touch screen; an audio output device for producing sound, such as speaker(s) 214; one or more audio capture device(s), such as a microphone or an array of microphones 216 for receiving audio input; one or more image and/or video capture devices, such as camera(s) 218; and other components. The speaker(s) 214, microphone(s) 216, camera(s) 218, and other components may be integrated into the wearable computing device 100 or may be separate.

The display 212 may be a video output device for displaying images. The display 212 may be a display of any suitable technology, such as a liquid crystal display, an organic light emitting diode display, electronic paper, an electrochromic display, a cathode ray tube display, a pico projector or other suitable component(s). The display 212 may also be integrated into the wearable computing device 100 or may be separate.

The input/output device interfaces 210 may also include an interface for an external peripheral device connection such as universal serial bus (USB), audio port connection, FireWire, Thunderbolt or other connection protocol. The input/output device interfaces 210 may also include a connection to one or more networks 106 and/or antennae 220. For example, the input/output device interfaces 210 may connect to the one or more networks 106 and/or antennae 220 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, GPS networks, etc. Another device, such as a smartphone 102, may also connect directly to the wearable computing device 100 via one of these wired or wireless connections.

The wearable computing device 100 may also include one or more a biometric measurement components 222. The biometric measurement components 222 may be a fingerprint reader, a retinal scanner, a cardiac rhythm recorder for recording electrocardiography (ECG or EKG), and/or other biometric recording or scanning device capable of measuring a unique physical or behavioral characteristic of the user. The biometric measurement components 222 may also be integrated into the wearable computing device 100 or may be separate from the wearable computing device 100, but communicatively connected thereto.

The wearable computing device 100 may also include one or more location components 224. The location components 224 may include a Wi-Fi technology operating in a receive-only mode, such as a Wi-Fi chipset. The location components 224 may receive Wi-Fi signals or beacons from nearby Wi-Fi networks, for example from the antennae 220, that can be used to determine a location of the wearable computing device 100. In general, one benefit to using receive-only is that this mode does not consume as much power as a normal Wi-Fi transmit and receive mode. Additionally, it allows the gain of the antenna to be reduced as compared to a Wi-Fi chipset in a smartphone. The location components 224 may also include GPS or similar location components.

The wearable computing device 100 may also include an authentication module 226 including an authentication controller 228. The authentication module 226 and/or controller 228 may be used to prompt the user for authentication or re-authentication. The authentication module 226 and/or controller 228 may also receive the user input authentication data from the user via the display 212, biometric measurement components 222, speaker(s) 214, microphone(s) 216, camera(s) 218, or other component. The authentication module 226 may compare user input authentication data to stored authentication data (for example stored in storage 208). The authentication module 226 may create authentication confirmation data based on the user input authentication data, based on the comparison of the user input authentication data to stored authentication data, or based on other data. The authentication module 226 and/or controller 228 may also cause transmission of the authentication confirmation data, and defer transmission of the authentication confirmation data until the wearable computing device 100 is directly or indirectly in communication with the authentication server.

Figure 3:
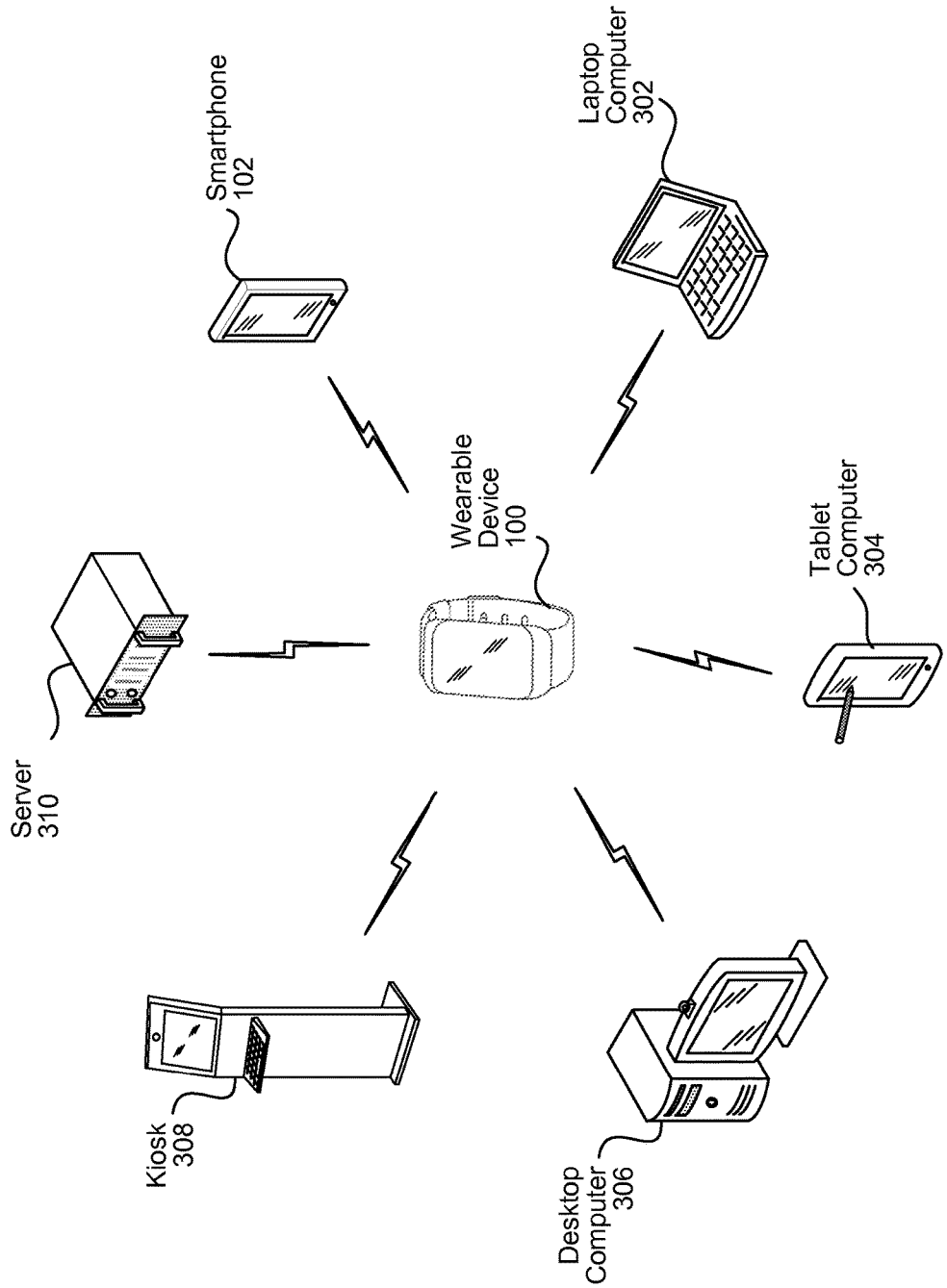
FIG. 3 illustrates exemplary devices the wearable computing device may communicate with according to aspects of the present disclosure.
Figure 4:
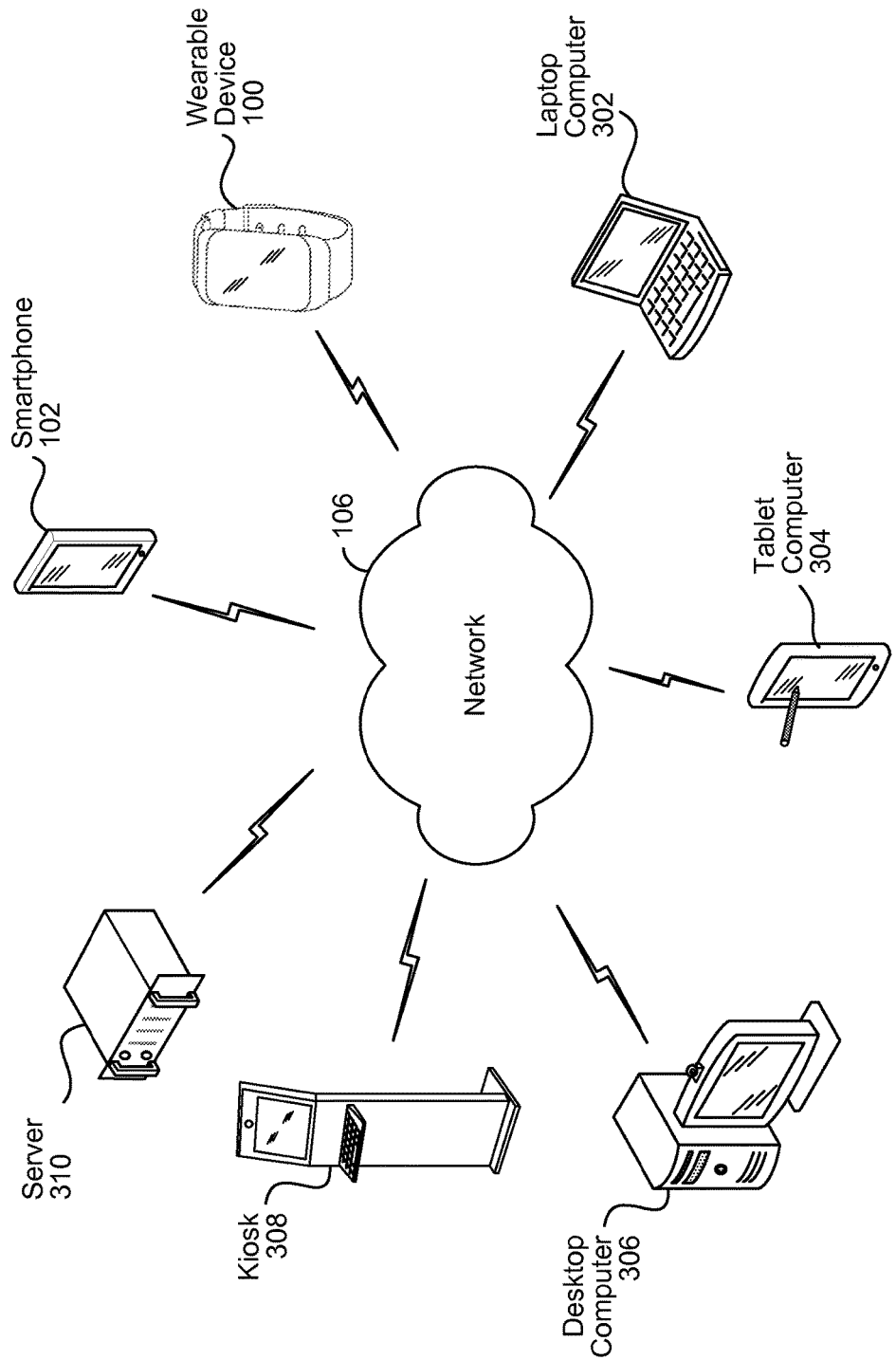
FIG. 4 illustrates exemplary devices the wearable computing device may communicate with via a network according to aspects of the present disclosure.

Although the wearable computing device 100 may communicate (i.e. via the smartphone 102) with the authentication server 104 through a network 106, the wearable computing device 100 may also communicate with the authentication server 104 through any device. For example, referring to FIG. 3, the wearable computing device 100 may communicate with the authentication server 104 through a wired or wireless connection with one or more of the smartphone 102, a laptop computer 302, a tablet computer 304, a desktop computer 306, a kiosk 308, a server 310, or other device to provide regular re-authentication. In another example, the authentication server may be implemented on any of the devices illustrated in FIG. 3 (for example, in the kiosk 308), enabling direct communication between the authentication server and the wearable computing device 100, such as through a wired or wireless connection, (for example, wireless Bluetooth or similar technology). Referring to FIG. 4, the wearable computing device 100 may also communicate with any of the smartphone 102, laptop computer 302, tablet computer 304, desktop computer 306, kiosk 308, server 310, or other device via the network 106. As described above, the network 106 may be a wireless local area network (WLAN) (such as WiFi) radio, Bluetooth, infrared (IR), and/or wireless network radio, such as a radio capable of communication with a wireless communication network such as a Long Term Evolution (LTE) network, WiMAX network, 3G network, GPS network, etc.

Figure 5:
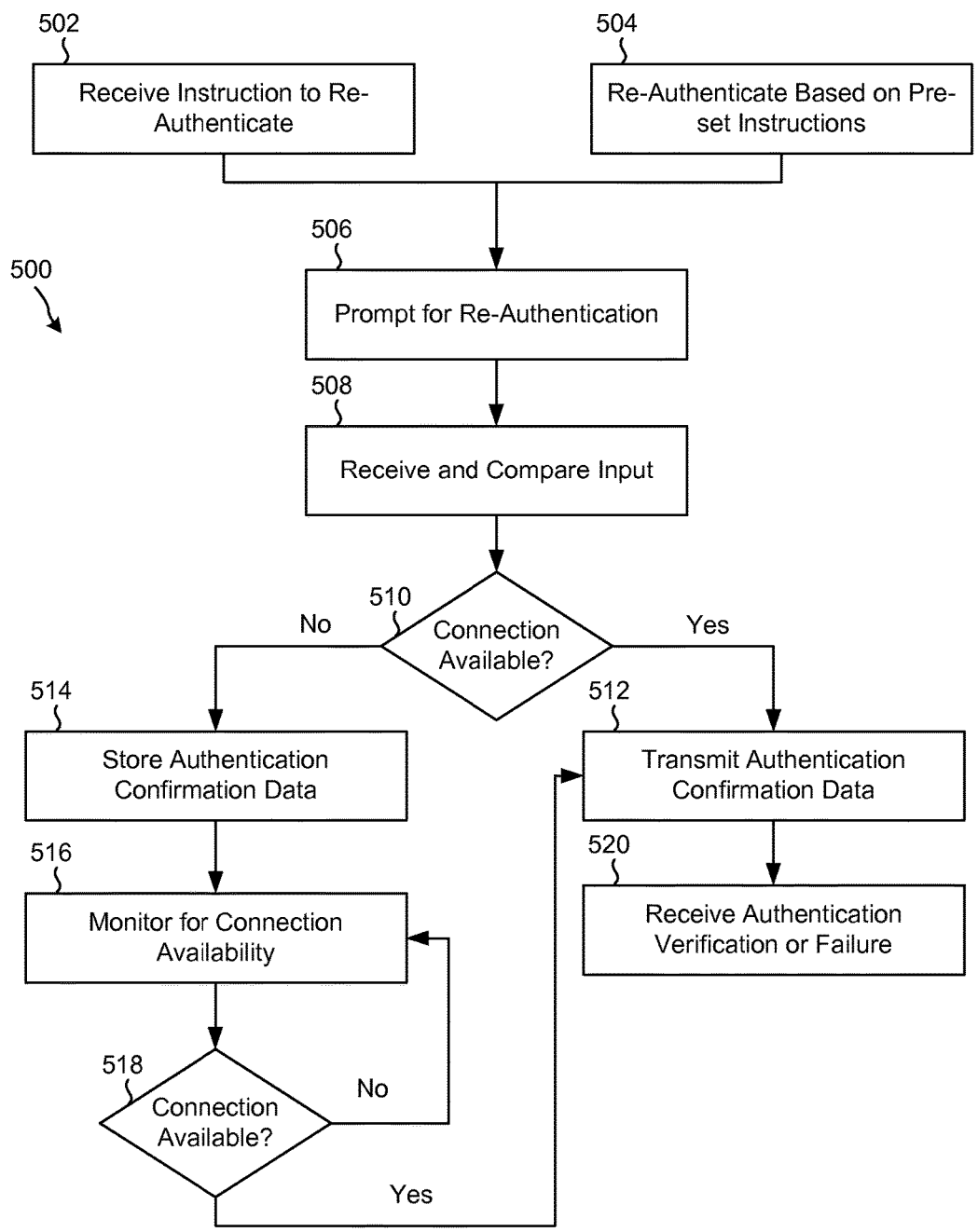
FIG. 5 illustrates a functional block diagram of a method for performing deferred authentication according to aspects of the present disclosure.

A functional block diagram of a method 500 for performing deferred authentication is described with reference to FIG. 5. As illustrated in FIG. 5, the wearable computing device receives an instruction, for example, from the authentication server, to re-authenticate, illustrated as block 502. Alternatively, the wearable computing device may have pre-set instructions stored on the wearable computing device to re-authenticate based on pre-set time intervals (for example, in a pre-set number of hours, days, weeks, etc.) or based on certain actions (for example, the wearable computing device being removed from the user), illustrated as block 504.

Upon being instructed to re-authenticate, the wearable computing device may prompt the user to re-authenticate, illustrated as block 506. The user may re-authenticate in any number of different ways, for example, the user may input authentication data in the form of a PIN, a voice command, a fingerprint, an ECG or EKG waveform, a retinal scan, a facial picture, etc. The wearable computing device may also obtain data without the user taking action, for example, by taking measurements using the biometric measurement component(s) 222. The wearable computing device receives the user input authentication data and compares it to stored authentication data to authenticate the input, illustrated as block 508, and determines whether there is a communication connection available, illustrated as block 510. As described above, the communication connection may be a connection to the authentication server or another device via a wireless network.

When the communication connection is available, the wearable computing device may simply cause authentication confirmation data to be transmitted to the authentication server directly or via another device, illustrated as block 512. However, when the communication connection is unavailable, the wearable computing device may store the authentication confirmation data, illustrated as block 514. The wearable computing device may then or continuously monitor for communication connection availability, illustrated as block 516, and determine whether the communication connection is available, illustrated as block 518. When the communication connection becomes available, the wearable computing device may then cause the authentication confirmation data to be transmitted to the authentication server directly or via another device, illustrated as block 512.

As described above, the authentication confirmation data may be a PIN, password, fingerprint, voiceprint, or other biometric feature. To further increase security, the authentication confirmation data may be data created or generated based on the user input authentication data or biometric data. For example, the authentication confirmation data may be encrypted, information extracted from the user input authentication data, an indication that the user input authentication data corresponds to stored authentication data stored on the wearable device, or other information that may be used to identify the user input authentication data to prevent others from intercepting or otherwise obtaining the raw input data. Additionally, the authentication confirmation data may be data corresponding to whether the user input authentication data matches the stored authentication data.

The authentication server analyzes the authentication confirmation data and determines whether the user authentication is correct or incorrect and transmits a message verifying the authentication or stating that the authentication failed. The wearable computing device receives the authentication verification or failure, illustrated as block 520. Upon receiving an authentication verification, the wearable computing device may function as intended for the user. However, upon receiving an authentication failure, the wearable computing device may disable itself to prevent unauthorized use. The wearable computing device may also disable itself when the input data does not match the stored data.

This deferred authentication methodology allows the user to input authentication data even when the wearable computing device is not or cannot connect to an authentication device or server right away. For example, the user may receive a prompt, via the wearable computing device or another user device, such as the user's smartphone, to re-authenticate today by 6 p.m. If the user received the prompt at 8 a.m. and did not re-authenticate immediately, but remembered later that day, for example, at noon, the user may input the data, even if the user is in an area where there is no access to the network. The wearable computing device may then cause the authentication confirmation data to be transmitted for authentication verification when the network connection is available without the user having to re-input the authentication data.

In an aspect, the wearable computing device may be a wearable device for authenticating financial transactions, and the authentication server may be a server operated by or on behalf of a credit card company. In this aspect, the authentication server may send an instruction requesting re-authentication in response to a payment or other type of transaction the user is attempting to perform. A functional block diagram of a method 600 for performing deferred authentication is described with reference to FIG. 6. As illustrated in FIG. 6, the wearable computing device may be used to initiate a payment transaction, illustrated as block 602. In response to the initiation of the payment transaction, the wearable computing device may determine whether the wearable computing device is already authenticated or pre-authenticated, illustrated as block 604. For example, the wearable computing device may have been authenticated prior to the initiation of the payment transaction. In this situation, the wearable computing device may determine it is already authenticated, and proceed with the payment transaction, illustrated as block 606. The financial institution may perform its own checks or confirmations as part of the financial transaction (for example, determining whether the user has sufficient credit/funds for the transactions), however those operations are generally beyond the scope of this disclosure.

On the other hand, when the wearable computing device is not authenticated, an instruction to re-authenticate may be received or initiated, illustrated as block 608. The wearable computing device may then prompt the user to re-authenticate, illustrated as block 610. The wearable computing device receives the user input authentication data and compares it to stored authentication data, illustrated as block 612, and determines whether there is a communication connection available, illustrated as block 614.

When the communication connection is available, the wearable computing device causes authentication confirmation data to be transmitted to the authentication server directly or via another device, illustrated as block 616; however, when the communication connection is unavailable, the wearable computing device may store authentication confirmation data, illustrated as block 618. The wearable computing device monitors for communication connection availability, illustrated as block 620, and determines whether the communication connection is available, illustrated as block 622. When the communication connection becomes available, the wearable computing device causes the authentication confirmation data to be transmitted to the authentication server directly or via another device, illustrated as block 616.

The authentication server analyzes the authentication confirmation data and determines whether the user authentication is correct or incorrect and transmits a message verifying the authentication or stating that the authentication failed. The wearable computing device receives the authentication verification or failure, illustrated as block 624. Upon receiving an authentication verification, the wearable computing device may function as intended for the user. For example, the payment transaction may be authorized and the wearable computing device may proceed with the payment transaction, illustrated as block 626. (As above with block 606, as part of the payment transaction the financial institution may perform further checks or authentications.) However, upon receiving an authentication failure, the wearable computing device may disable itself to prevent unauthorized use.

In an aspect, the payment transaction may not be authorized until the re-authentication is successful. Additionally, the instruction to re-authenticate can be specific, for example, instructing re-authentication occur within a specified time (such as within the next 6 hours), and/or requesting a specific type of user input authentication data (such as a fingerprint).

In an aspect, the wearable computing device may record location information, and this location information may be used in the authentication methods described above. For example, the wearable computing device may include a Wi-Fi chipset (for example a Wi-Fi chipset operating in a receive-only mode). In this aspect, the wearable computing device may receive one or more beacons that are in range of the wearable computing device. The beacon(s) may broadcast a network identifier, such as an SSID and/or a MAC address, and a location of the wearable computing device may be determined based on the beacon(s) received and a database correlating beacons to locations stored in a server, such as the authentication server or another backend server. In another aspect, the wearable computing device (or other device) may compare the network identifier(s) detected by the wearable computing device with stored network identifier(s). If the network identifier(s) detected by the wearable computing device match the stored network identifier(s), the system may determine the wearable computing device to be in an authorized location. In an aspect, a portion of a location database may be cached onto the wearable computing device, based on an estimated location of the wearable computing device. For example, the wearable computing device may cache a portion of a location database including network identifiers corresponding generally to the location of the wearable computing device. This may allow the wearable computing device to check its location without communicating with the authentication server or other backend server.

In another aspect, the wearable computing device may be in communication with another device, such as the user's smartphone. The wearable computing device may then receive location information (such as stored network identifiers) from the user's smartphone. For example, the user's smartphone may provide GPS data, Wi-Fi beacon data, and/or other location information to the wearable computing device to identify the location.

A functional block diagram of a method 700 for determining location is described with reference to FIG. 7. As illustrated in FIG. 7, the wearable computing device detects Wi-Fi network beacons in range of the wearable computing device, illustrated as block 702. The wearable computing device stores the network identifiers of the detected beacons, illustrated as block 704. Once the beacons are detected and stored, the wearable computing device may determine the location of the wearable computing device or send the beacon/network identifier information to another device or server for determining location. In addition to using network identifiers, specific signal strength or other signal quality metrics may be used to determine a more precise location of the wearable computing device.

In an aspect, the wearable computing device determines whether the wearable computing device is to determine/is capable of determining the location, or whether the wearable computing device is to send the information to another device or server, illustrated as block 706.

In an aspect, the wearable computing device transmits the stored beacon information to a backend server, such as the authentication server, illustrated as block 708, or other device adapted to/capable of determine a location based on the beacon information (such as, a mobile communication device or smartphone, a computer, a tablet computer, etc.). The server/other device determines the location and the wearable computing device receives the location information based on the stored beacon information from the server/other device, illustrated as block 710.

In another aspect, the wearable computing device caches beacon information correlated with location information, and the wearable computing device compares the stored beacon information with the cached information, illustrated as block 712. Using the cached information, the wearable computing device identifies the location, illustrated as block 714.

In an aspect, the location information may be coupled to the instruction or request for re-authentication. For example, the request for re-authentication may request that the re-authentication be performed at the user's home, office, or other pre-determined location known to the user. The pre-determined location may also be selected by the user to be a location at which authentication may be performed. A functional block diagram of a method 800 for re-authenticating using location information is described with reference to FIG. 8. As illustrated in FIG. 8, the wearable computing device receives an instruction, for example from an authentication server, to re-authenticate at a pre-authorized location, illustrated as block 802. For example, the instruction may be an instruction to perform an authentication operation in at least one specified location, such as the user's residence/home or office.

In response to the instruction, the wearable computing device may prompt the user to re-authenticate the wearable computing device by inputting authentication data, illustrated as block 804. The user may input user input authentication data, and the wearable computing device receives the user input authentication data and compares it to stored authentication data, illustrated as block 806. Upon receiving and comparing the user input authentication data, the wearable computing device may determine whether the user input authentication data matches the stored authentication data and determine whether the wearable computing device is at a known location (i.e., a pre-set location for receiving authentication data input), illustrated as block 808. If the wearable computing device is at a known location, the authentication confirmation data may be transmitted to the authentication server when the wearable computing device is connected to the network, illustrated as block 810. However, if the wearable computing device cannot determine whether the wearable computing device is at a known location, the wearable computing device may begin detecting Wi-Fi network beacons in range of the wearable computing device, illustrated as block 812. The wearable computing device may optionally receive or identify the location based on the detected beacons and corresponding network identifiers, illustrated as block 814. Alternatively, the beacon information may be transmitted along with the authentication confirmation data to the authentication server when the wearable computing device is connected to the network, illustrated as block 810. Upon authentication, the wearable computing device may receive an authentication verification or failure, illustrated as block 816. Upon receiving an authentication verification, the wearable computing device may function as intended for the user. However, upon receiving an authentication failure, the wearable computing device may disable itself to prevent unauthorized use. The wearable computing device may also disable itself when the input data does not match the stored data.

In another aspect, the request for re-authentication may request that the re-authentication be performed at a point of sale, such as when the wearable computing device is being used to perform a payment transaction. A functional block diagram of a method 900 for re-authenticating using point of sale location information is described with reference to FIG. 9. As illustrated in FIG. 9, a payment transaction may be initiated using the wearable computing device, illustrated as block 902. In response to the initiation of the payment transaction, the wearable computing device may determine whether the wearable computing device is already authenticated or pre-authenticated, illustrated as block 904. For example, the wearable computing device may have been authenticated prior to the initiation of the payment transaction. In this situation, the wearable computing device may determine it is already authenticated, and proceed with the payment transaction, illustrated as block 906.

On the other hand, when the wearable computing device may is not authenticated, in a similar manner as described above with reference to FIG. 8, the wearable computing device receives an instruction, for example from an authentication server, to re-authenticate at the point of sale, illustrated as block 908. In response to the instruction, the wearable computing device may prompt the user to re-authenticate the wearable computing device by inputting authentication data, illustrated as block 910. The wearable computing device may receive input user input authentication data and compare it to stored authentication data, illustrated as block 912.

Upon receiving and comparing the user input authentication data, the wearable computing device may determine whether the user input authentication data matches stored authentication data and determine whether the wearable computing device is at a known location (i.e., a pre-set location for receiving authentication data input), illustrated as block 914. If the wearable computing device is at a known location, the authentication confirmation data may be transmitted to the authentication server when the wearable computing device is connected to the network, illustrated as block 916. However, if the wearable computing device cannot determine whether the wearable computing device is at a known location, the wearable computing device may begin detecting Wi-Fi network beacons in range of the wearable computing device at the point of sale, illustrated as block 918. The wearable computing device may optionally receive or identify the location based on the detected beacons and corresponding network identifiers, illustrated as block 920. Alternatively, the beacon information may be transmitted along with the authentication confirmation data to the authentication server when the wearable computing device is connected to the network, illustrated as block 916. The authentication server may use the authentication confirmation data to authenticate the user, and the location or beacon information to verify that the user is at the point of sale corresponding to the payment transaction. The wearable computing device may receive an authentication verification or failure, illustrated as block 922. Upon receiving an authentication verification, the wearable computing device may function as intended for the user. For example, the payment transaction may be authorized and the wearable computing device may proceed with the payment transaction, illustrated as block 924. However, upon receiving an authentication failure, the wearable computing device may disable itself or cancel the payment transaction to prevent unauthorized use. The wearable computing device may also disable itself when the input data does not match the stored data.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   determining to perform a user authentication based at least in part on initiation of a payment transaction;
   receiving, by a device at a first time and at a point of sale location, user input authentication data identifying a user;
   determining the user input authentication data matches at least a portion of stored authentication data stored on the device;
   detecting, by the device proximate to the first time, a Wi-Fi signal;
   determining an identifier corresponding to the Wi-Fi signal;
   determining the identifier matches a first stored identifier stored on the device, wherein the first stored wireless network identifier corresponds to the point of sale location;
   determining the point of sale location corresponds to an authorized location; and
   authorizing the payment transaction.

2. The method of claim 1, wherein the point of sale location corresponds to a home of the user.

3. The method of claim 1, further comprising disabling an operation of the device in response to the user data being received at an unauthorized location.

4. A method comprising:
   determining to perform a user authentication at a point of sale location based at least in part on initiation of a payment transaction;
   receiving, by a first device at a first time and at the point of sale location, user input authentication data;
   determining the user input authentication data matches at least a portion of stored authentication data;
   detecting, by the first device proximate to the first time, a Wi-Fi signal;
   determining, by the first device, an identifier corresponding to the Wi-Fi signal, the identifier corresponding to the point of sale location; and
   one of:
      determining that the identifier corresponds to an authorized location and allowing the payment transaction;
      or
      determining that the point of sale location does not correspond to an authorized location, and denying the payment transaction.

5. The method of claim 4, further comprising:
   sending to a second device at a second time, first information corresponding to the user input authentication data and second information corresponding to the identifier.

6. The method of claim 4, further comprising:
   comparing the user input authentication data to the stored authentication data stored on the first device; and storing an indication that the user input authentication data matches the stored authentication data.

7. The method of claim 5, wherein the second information includes the identifier.

8. The method of claim 4, wherein the determining to perform the user authentication is in response to receiving a request for user authentication from a second device.

9. The method of claim 8, wherein the request comprises an instruction to perform an authentication operation at the point of sale location.

10. The method of claim 4, wherein the first device is wearable by a user.

11. The method of claim 4, wherein the user input authentication data comprises biometric authentication data of a user, wherein the biometric authentication data comprises data describing a physical characteristic of the user.

12. The method of claim 5, wherein:
the user input authentication data comprises biometric authentication data of a user, wherein the biometric authentication data comprises data describing a physical characteristic of the user; and
the first information comprises the biometric authentication data.

13. The method of claim 4, further comprising disabling an operation of the first device in response to determining that the point of sale location does not correspond to an authorized location.

14. A first device, comprising:
at least one processor and a memory including instructions operable to be executed by the at least one processor to perform a set of actions, configuring the processor to:
determine to perform a user authentication at a point of sale location based at least in part on initiation of a payment transaction;
receive, by the first device at a first time and at the point of sale location, user input authentication data;
determining the user input authentication data matches at least a portion of stored authentication data;
detect, by the first device proximate to the first time, a Wi-Fi signal;
determine, by the first device, an identifier corresponding to the Wi-Fi signal, the identifier corresponding to the point of sale location; and
one of:
determine that the identifier corresponds to an authorized location and allowing the payment transaction; or
determine that the point of sale location does not correspond to an authorized location, and denying the payment transaction.

15. The first device of claim 14, wherein the at least one processor is further configured to:
send to a second device at a second time, first information corresponding to the user input authentication data and second information corresponding to the identifier.

16. The first device of claim 14, wherein the at least one processor is further configured to:
compare the user input authentication data to the stored authentication data stored on the first device; and
store an indication that the user input authentication data matches the stored authentication data.

17. The first device of claim 15, wherein the second information includes the identifier.

18. The first device of claim 14, wherein the at least one processor is configured to determine to perform the user authentication in response to receiving a request for user authentication from a second device, the request comprising an instruction to perform an authentication operation at the point of sale location.

19. The first device of claim 14, wherein the first device is wearable by a user.

* * * * *